Aug. 6, 1968

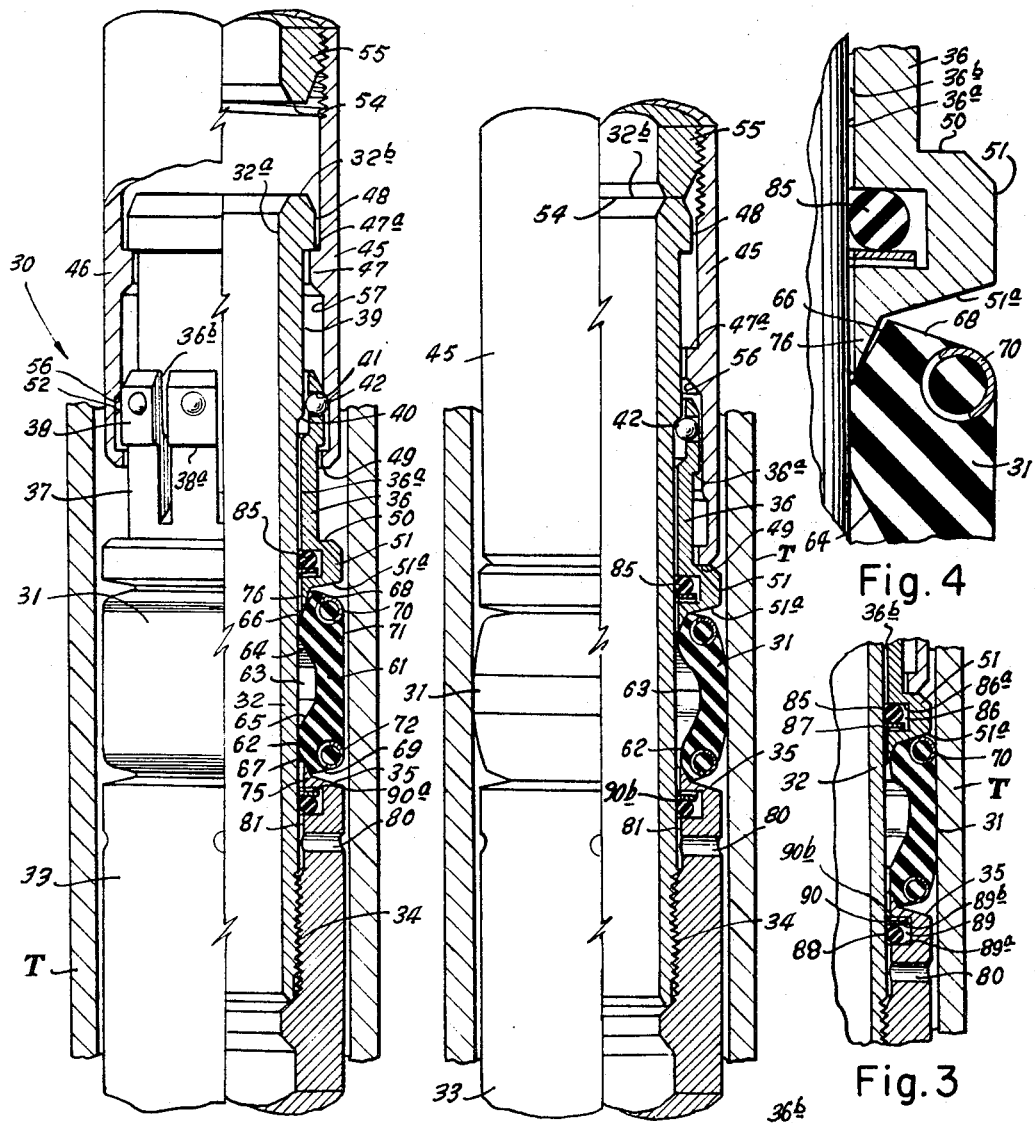

J. W. TAMPLEN 3,395,728

ONE WAY SEAL

Original Filed June 10, 1964

INVENTOR
Jack W. Tamplen

BY E. Hastings Ashley
and
Walter J. Jaynes
ATTORNEYS

United States Patent Office 3,395,728
Patented Aug. 6, 1968

3,395,728
ONE WAY SEAL
Jack W. Tamplen, Celino, Tex., assignor to Otis Engineering Corporation, Dallas, Tex., a corporation of Delaware
Original application June 10, 1964, Ser. No. 374,046, now Patent No. 3,227,462, dated Jan. 4, 1966. Divided and this application Sept. 10, 1965, Ser. No. 495,746
5 Claims. (Cl. 137—525)

This application is a division of my co-pending application Ser. No. 374,046, filed June 10, 1964, now Patent No. 3,227,462, for Seal Assemblies for Tubular Conductors.

This invention relates to new and useful improvements in seals, and more particularly to sealing devices for effecting a fluid tight seal between adjacent surfaces.

One object of this invention is to provide a new and improved sealing device.

A further object of the invention is to provide in a sealing device a sealing ring structure which will act to seal against pressure in one direction but which will allow flow therepast in the opposite direction.

A further object of the invention is to provide in a well tool packing assembly of the character described, a seal ring structure which will permit flow of fluids in one direction therepast but which will seal off the flow of fluids and pressure in the opposite direction, whereby the seal ring is effective to prevent flow of fluids therepast in only one direction.

Additional objects and advantages of the invention will be readily apparent from the reading of the following description of a device constructed in accordance with the invention and reference to the accompanying drawings thereof, wherein:

FIGURE 1 is a fragmentary view, partly in elevation and partly in section, showing a portion of a well tool and a sealing assembly embodying the invention provided on such well tool and disposed in retracted non-sealing position in a well flow conductor;

FIGURE 2 is a view similar to FIGURE 1 showing the sealing assembly in initial expanded sealing position;

FIGURE 3 is a fragmentary, vertical sectional view of the sealing assembly of FIGURE 2 showing the main sealing element with fluid pressure applied thereto in one direction;

FIGURE 4 is an enlarged fragmentary sectional view of a portion of the main sealing element and the mechanical expander therefor shown in FIGURE 1;

FIGURE 5 is an enlarged fragmentary sectional view of a seal ring used in the structure of FIGURE 1 showing the ring in its normal position;

FIGURE 6 is a view similar to FIGURE 5 showing the sealing ring sealing against flow in one direction therepast;

FIGURE 7 is a view similar to FIGURE 5 showing the sealing ring moved to an exaggerated non-sealing position to permit fluid to flow therepast in the direction opposite therepast;

Figures 13, 14:
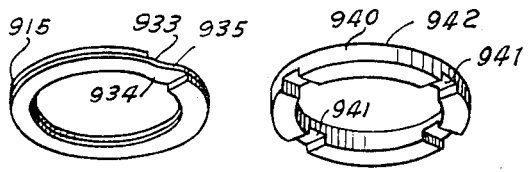
FIGURE 13 is a perspective view of a spacer ring for use in the device in FIGURE 12.
FIGURE 14 is an isometric view of a modified form of spacer ring for permitting flow of fluids past the seal rings of FIGURES 11 and 13.

Referring now to the drawings, particularly to FIGURES 1 through 4 thereof, a device having a sealing assembly 30 with a one-way seal structure therein embodying the invention is shown disposed within a well conductor, such as a well tubing string. The sealing device is more fully described in my co-pending application Ser. No. 374,046, of which this application is a division, and includes an elastic, resilient sealing element 31 which is annular in form and slidably mounted upon and about an elongate tubular mandrel 32 having a bore 32a. A lower sub 33 is attached as by threads 34, to the lower end of the mandrel and the upwardly facing upper end 35 of the sub supports the sealing element 31 and limits downward displacement thereon on the mandrel.

A cylindrical expander 36, having an internal bore 36a is slidably mounted on the tubular mandrel above the sealing element and is adapted to be moved downwardly on the mandrel into engagement with the sealing element to compress and mechanically expand the sealing element into initial sealing engagement with the bore wall of the well tubing T. The expander is formed with a plurality of upwardly extending fingers 37 having external bosses 38 at their upper free ends. The mandrel 32 has an enlarged exterior upper portion 39 which provides an inwardly and downwardly extending external annular shoulder 40 intermediate the ends of the mandrel, and the upper portion of the bore 36a of the expander is enlarged at its upper portion so that the upper ends of the fingers are adapted to telescope over the lower portion of the enlarged portion 39 of the mandrel, as clearly shown in FIGURE 1. The bosses 38 of the finger 37 are each provided with an aperture 41 extending transversely therethrough and in which a ball 42 is disposed for radial movement therein relative to the expander. When the expander is slidably positioned on the mandrel with the apertures of the fingers and the balls carried therein adjacent the enlarged mandrel portion 39, the balls 42 project outwardly of the bosses of the expander fingers and are held in such expanded or projected positions by the external surface of the enlarged portion of the mandrel.

A locking sleeve 45 is telescoped on the mandrel 32 and has its lower portion 46 telescoped also about the upper end of the expander 36. The locking sleeve is movable downwardly on the mandrel to move the expander sleeve 36 downwardly to the position shown in FIGURE 2 wherein the sealing element 31 is disposed in the expanded position.

A conventional wireline running and pulling tool, such as the running and pulling tool disclosed in U.S. Patent No. 2,348,563, to H. C. Otis, may be connected with the upper sub 55 and used to force the locking sleeve downwardly relative to the mandrel when it is desired to expand the sealing element. Of course, other suitable means for moving the locking sleeve may also be employed.

When the expander element has been moved to its lowermost position, shown in FIGURE 2, the sealing element 31 is longitudinally compressed and the central portion thereof is deformed outwardly into engagement with the wall of the well tubing T. The central recess 63 formed in the bore of the sealing element 31 provides a thinner wall section or portion in the medial portion of the sleeve which will flex more readily than the remainder of the sleeve, and hence the sleeve will flex outwardly into the initial sealing engagement with the tubing as is shown.

As shown in FIGURES 2 and 3, the pressure from below the sealing element enters from a lateral port 80 formed in the wall of the lower sub 33 above the threads 34 and passes upwardly through an annular space 81 between said sub and the mandrel 32 and past the frusto-conical members 75 into the bore of the enlarged portion 63 of the bore of the sealing element. The fluid pressure then tends to move the sealing element outwardly into the position shown in FIGURE 3 wherein the upper anti-extrusion ring 70 is disposed in abutting engagement with the bore wall of the tubing string T and with the outer portion of the inclined lower surface 51a of the flange 51 of the expander element, whereby the fluid pressure cannot pass outwardly from within the sealing element into the annular space exteriorly of the expander element. The upward and outward inclination of the surface 51a also tends to cause the anti-extrusion element to move outwardly towards the tubing wall.

For preventing fluid pressure from passing upwardly within the expander element between the expander element and the mandrel 32, the one-way seal device of the invention is provided. The seal device includes an O-ring type sealing element or ring 85 is disposed in an internal annular groove 86 formed in the bore of the flange portion 51 of the expander element and is adapted to seal between the upper shoulder 86a of such recess and the exterior surface of the mandrel, as clearly shown in FIGURES 3 and 6. The O-ring sealing ring will therefore prevent fluid pressure from below the sealing element 31 from passing upwardly out of the element 31 past the expander member 36, and the fluid pressure will be trapped below the expander member and within the sealing element.

While the sealing element 85 is moved upwardly by fluid pressure from the annular space between the expander member 36 and the mandrel into sealing engagement with the upper surface 86a of the recess and the exterior surface of the mandrel 32, downward flow of fluids from the annular space 36b between the bore 36a of the expander member 36 and the exterior of the mandrel 32 may take place because of the provision of an annular spacer ring 87 disposed in the recess 86 below the O-ring 85 and resting on the upwardly facing shoulder or surface 86b at the bottom of the recess. The spacer ring 87 has a plurality of laterally extending or radially extending flow passages 87a formed in its lower surface resting on the surface 86b whereby the pressure of fluids flowing downwardly through the annular space 36b and acting on the O-ring 85 will tend to force the O-ring 85 outwardly in the recess 86 on the upper supporting surface 87b of the spacer ring to the position shown in exaggerated form in FIGURE 7 wherein the O-ring is spaced from the exterior surface of the mandrel 32 and fluids may flow downwardly between the O-ring in the annular space 36b between the expander element and the mandrel. The openings or passages 87a and the ring 87 prevent trapping of fluid pressure between the O-ring and the lower surface 86b of the recess and permit the O-ring to move outwardly of the recess 86 towards the position shown in exaggerated form in FIGURE 7 whereby fluids may readily flow downwardly past the upper O-ring 85 into the bore of the sealing element therebelow. However, fluids from below the sealing element 85 are prevented from flowing upwardly through the annular space 36b past the O-ring 35, since the O-ring will engage the upper surface 86a of the recess and the exterior surface of the mandrel 32 as shown in FIGURE 6 to prevent fluid flow the repast. The passages 87a permit fluid pressure to enter the chamber 86 outwardly of the O-ring and act on the outer surface of the O-ring to force the O-ring into the sealing position shown in FIGURE 6.

Rings similar to the ring 87 are shown in FIGURES 13 and 14, though the ring may be of other forms.

An O-ring sealing ring or element 88 similar to the O-ring sealing ring 85 is disposed in an internal annular recess 89 similar to the recess 86 formed in the upper end of the lower sub 33 between the inlet port 80 and the upper end surface 35 of the sub, as is shown in FIGURES 1 through 3. The lower sealing shoulder 89a of the recess will be engaged by the O-ring sealing element 88 to prevent downward flow of fluids from within the main sealing element 31 through the annular space 81 between the mandrel and the upper end of the lower sub and thence outwardly through the port 80. However, an annular spacer ring 90 having a lower supporting surface 90b and radial passages 90a in its upper surface, which is similar in all respect to the spacer ring 87 disposed in the upper recess 86 below the upper O-ring 85 and having a radial flow passage 87a formed therein, but is disposed above the O-ring 88, will permit the fluid pressure of the fluids flowing inwardly through the port 80 and upwardly through the annular space 81 toward the interior of the sealing element 31 to pass such O-ring, the O-ring being moved outwardly of the recess 89, away from the mandrel 32 to permit the fluids to pass. The spacer ring 90 and the passages 90a formed therein prevent the O-ring from sealing against the upper surface 89b of the recess 89 in the same manner as the ring 87 prevents the O-ring 85 from sealing against the lower surface 86b of the recess 86.

Obviously, from the foregoing, it will readily be seen that, fluid pressure from below the main sealing element 31 may pass upwardly and inwardly through the annular space 81 past the O-ring 88 and into the enlarged portion 63 of the bore of the main sealing element, where it will act on the sealing element to force the same outwardly toward the position shown in FIGURE 3 wherein the anti-extrusion member 70 is engaged with the upper outer portion of the lower inclined surface 51 of the expander member and the bore wall of the tubing string and the sealing element is held against extrusion upwardly through the annular space between the flange 51 of the expander element and the bore wall of the tubing string. The fluid pressure within the chamber from below will pass upwardly through the lower portion of the annular passage 36b and into the recess 86 to force the O-ring sealing ring 85 into sealing engagement with the downwardly facing surface 86a and the mandrel 32 to prevent fluid pressure from escaping upwardly through the annular passage 36b past the O-ring 85.

If, however, the fluid pressure above the main sealing element should be greater than that below, the fluids under pressure from above will flow downwardly through the annular passage 36b between the expander member 36 and the mandrel 32, past the O-ring 85 and into the enlarged portion 63 of the bore of the sealing element 31 to deform the lower portion of the sealing element outwardly until the anti-extrusion member 72 engages the lower outer portion of the upper surface 35 of the lower 33 and the bore wall of the tubing string T to prevent further outer displacement of the sealing element. The main sealing element will then seal tightly between the surface 35 and the tubing bore wall. The fluid under pressure will then move downwardly through the upper portion of the annular space 81 into the annular recess 89 where it will act on the lower O-ring 88 to cause the same to be deformed in sealing engagement with the lower surface 89a of the recess 89 and the exterior of the mandrel 32 to prevent further flow of the fluid under pressure through the passage 81 and trap the fluid under pressure above the O-ring 88. Thus, the main sealing element is further firmly pressure expanded into tight sealing engagement between the mandrel and the bore wall of the tubing and the fluid pressure above the sealing element is trapped thereabove and cannot pass downwardly therepast.

When it is desired to remove the well device having the sealing assembly of FIGURES 1 through 4 thereon from within the well flow conductor, the pressures above and below the main sealing element 31 are preferably equalized by introduction of fluid pressure to the low pressure side of the sealing element by suitable equalizing tools (not shown). While, if the pressures are not large, the seal may be broken without equalizing pressures, but it is preferable that the pressures above and below the sealing element be equalized before the main sealing element is released from sealing position.

Figure 8:
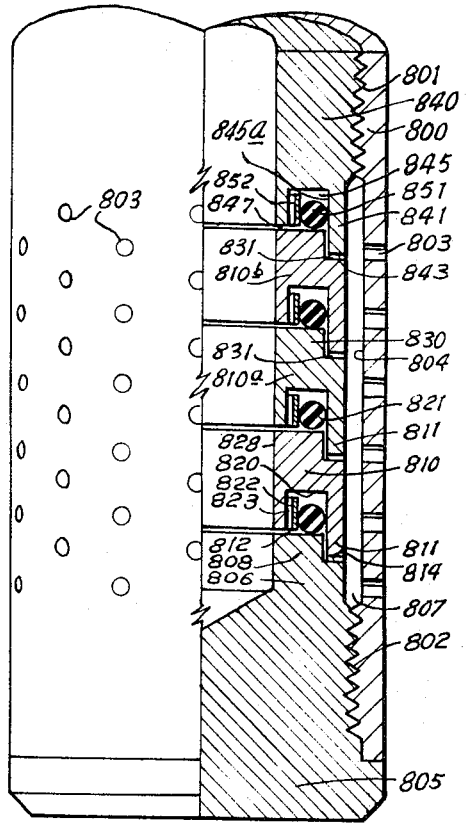
FIGURE 8 is a view of a plurality of seal rings similar to the seal rings of FIGURES 5 through 7, and showing the same mounted in a modified manner on a well tool for controlling flow in one direction through said tool.

In FIGURE 8 is shown a modified form of the one-way seal device of the invention, which includes a well apparatus having a plurality of the one-way seal O-rings sealing assemblies, such as are shown in FIGURES 5, 6 and 7, incorporated therein to provide for a substantial flow of fluids in one direction but likewise to provide for cutting off flow of fluids in the opposite direction therepast.

The apparatus includes an elongate outer sleeve 800 having internal screw threads 801 in the upper portion of its bore and internal screw threads 802 in the lower portion of its bore. A plurality of lateral apertures 803 are formed in the wall of the sleeve intermediate the threaded portions. A plug 805 is threaded into the lower end of the bore of the sleeve to close such bore. The plug has an upstanding annular flange 806 formed thereon having an external diameter less than the bore 804 of the sleeve 800 whereby an annular space 807 is formed between the flange and the sleeve. The upper portion of the flange is further reduced in diameter to provide an upstanding annular supporting ring 808, and a plurality of spacer rings 810, 810a and 810b, each having a depending flange 811 formed thereon are mounted above this upstanding supporting ring 808 with the ring disposed in a counter bore 812 in the lower portion of the lower ring 810. The ring 810 is shown in perspective view in FIGURE 9, and this view clearly illustrates that the lower portion of the depending flange 811 has a plurality of circumferentially spaced depending feet 813 formed integrally therewith which engage the shoulder 814 formed at the junction of the ring 808 with the upstanding flange 806 of the plug 805 to support the ring on the flange with a plurality of lateral flow passages or spaces 815 formed between the surface 814 and the lower end portion of the depending flange 811 between the feet 813, whereby fluid may flow inwardly or outwardly through such spaces 815 between the feet of the flange 811 and the surface 814 of the flange 806. The bore of the depending flange 811 is greater in diameter than the external diameter of the upstanding annular supporting ring 808 whereby an annular flow passage 816 is provided therebetween, and the length of the flange 811 and the feet 813 thereon is such that the lower annular surface 817 in the counterbore of the spacer ring within the flange 811 is spaced from the upper surface 812 of the annular supporting ring 808 to provide a continuous annular laterally extending passage 818 between the surfaces 812 and 817. Fluid may thus flow through the spaces 815 and the passages 816 and 818 from the exterior to the interior of the spacer ring, and vice versa. An annular sealing ring recess 820 is formed in the lower surface 817 of each of the spacer rings and an O-ring sealing ring 821 is received therein. A fluid passing spacer ring 822 is also received in the recess inwardly of the O-ring 821 and engaging the inner wall 820b of the recess. The O-ring is adapted to seal between the upper surface 812 of the supporting ring 808 and the outer wall 820a of the recess 820 to prevent outward flow of fluid from within the ring outwardly through the annular passage 816 between the depending flange 811 and the upstanding annular supporting ring, and the spaces 815 to the exterior of the supporting ring. The fluid passing spacer ring 822 is provided with a plurality of internal axially extending grooves 823 which provide flow courses between the spacer ring 822 and the inner surface 820b of the recess 820, whereby the fluid passing inwardly from exteriorly of the ring through the spaces 815 and the annular flow passage 816 between the flange 811 and the supporting ring 808 may pass the O-ring 821 and flow inwardly through the flow passage 818 between the inner lower surface 817 of the ring 810 and the upper surface 812 of the supporting ring into the bore 828 of the spacer ring 810, since the O-ring cannot seal against an imperforate or closed surface to prevent flow therepast. The upper end portion of each spacer ring is reduced in external diameter to provide an upstanding annular supporting ring 830 and an annular upwardly facing surface 831 identical to the supporting ring 808 and surface 814 at the upper end of the plug 805, and the ring 810a is adapted to be mounted on the upper end of the ring 810 and to co-act therewith in the same manner as the ring 810 co-acts with the upstanding supporting ring 808 of the plug. The ring 810a is identical in all respects to the ring 810 and contains an O-ring sealing ring 821 and a fluid passing spacer ring 822 identical to those of the ring 810 mounted in a groove 820 and functioning to control flow of fluids between the rings in the same manner as the ring and plug just described. Any number of the rings 810, 810a, 810b may be provided, depending upon the length of the sleeve 800. An uppermost retaining ring 840 is threaded into the threads 801 at the upper end of the bore of the sleeve 800, and this retaining ring has its lower portion reduced in diameter and formed identical to the lower portion of the spacer ring 810, so as to be provided with a depending annular flange 841 having feet 843 thereon engaging the upwardly facing shoulder 831 of the uppermost ring 810b surrounding the upstanding supporting ring 830 of such uppermost ring. An internal annular recess 845 is formed in the lower inner surface 847 of the retaining ring 840 and this recess receives an O-ring sealing ring 851 and a spacer ring 852 similar to the sealing rings 821 and the spacer rings 822 already described for controlling flow between the depending flange 841 and the upstanding supporting ring 830 of the uppermost ring 810b. The lower inner surface 847 of the counter bore of the retaining ring is spaced from the upper end surface 812 of the ring 810b to provide a flow passage 848 therebetween and fluid may flow inwardly through the passage 845 between the feet 843 at the lower end of the flange 841 of the retaining ring and past the O-ring sealing ring 851 into the bore of the retaining ring, but the O-ring will seal between the outer wall surface 845a of the recess 845 and the upper surface 812 of the spacer ring 810b to prevent outward flow of fluids.

Obviously, any number of the rings 810, 810b, may be provided to accommodate any desired amount of flow inwardly through the openings of the sleeve 800, and the O-rings will permit such inward flow but will prevent outward flow by their sealing engagement with the upper surfaces of the upstanding supporting rings and the depending annular flanges of the several elements. Thus, the O-rings provide a one way seal permitting inward flow but preventing outward flow through the structure.

Figures 10, 11:
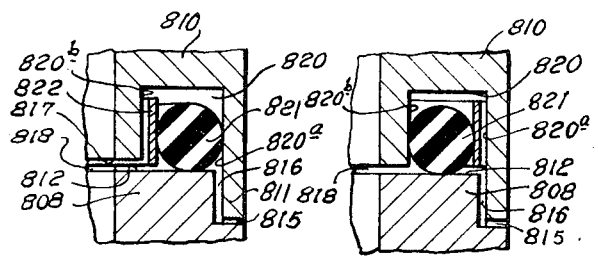
FIGURE 10 is an enlarged fragmentary vertical view of one of the sealing elements of FIGURE 8.
FIGURE 11 is a fragmentary view, similar to FIGURE 10, showing a modified form of spacer ring in a sealing device similar to that of FIGURE 8 for preventing flow in the opposite direction through the device.

FIGURE 10 is an enlarged view of the spacer rings and O-ring sealing members of the device of FIGURE 8, and carries corresponding numbers.

Figure 9:
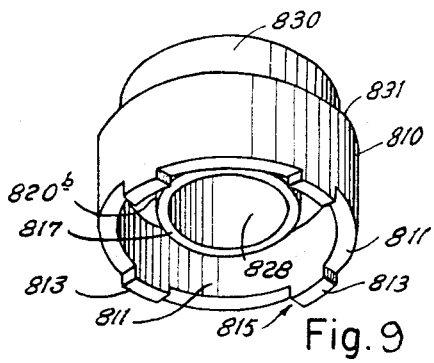
FIGURE 9 is a perspective view of one of the spacer rings of the device of FIGURE 8.

FIGURE 11 is a modification of the device of FIGURES 8 through 10, and shows the O-ring sealing ring 821 mounted in the annular recess 820 formed in the spacer ring member 810. Flow spaces 815 extending inwardly from the exterior of the members into the annular flow passage 816 formed between the supporting ring 808 and the bore of the flange 811 permit fluid to flow into the recess 820 to act on the O-ring 821 to cause the O-ring to seal against the inner wall surface 820b of the recess and surface 812 of the supporting ring 808 to prevent further flow of such fluid into the passage 818 and to the bore of the spacer ring. A flow passing spacer ring 822a having axially extending external grooves or recess 823a formed in its outer surface, is disposed in the recess 820 engaging the outer wall surface 820a which permits fluid pressure from within the bore 828 of the spacer ring 810 to flow outwardly past the O-ring and through the passage 816 and the spaces 815 to the exterior of the ring, since the O-ring cannot effect a seal with the wall 820a of the recess. This form of the device therefore permits outward flow but prevents inward flow.

FIGURES 12 through 15 illustrate a slight modification of the device of FIGURES 8 through 10, and show an O-ring sealing ring 913 disposed in an internal annular recess 901 formed in the bore wall of the depending annular flange 902 of an upper spacer ring member 900. The flange 902 has a plurality of integral circumferentially spaced depending feet 903 which engage the upper surface 904 of a lower spacer ring member 905 to provide a plurality of flow passages or spaces 906 extending inwardly between the lower end of the flange and the surface 904 from the exterior of the spacer ring members into an annular flow passage 907 formed between the bore wall of the depending flange 902 of the upper spacer ring member and an annular projection or neck 908 on the lower spacer ring member extending upwardly from the upper surface 904 of the lower ring member. The inner upper end of the neck is upwardly and inwardly beveled and is spaced from an inwardly and upwardly inclined shoulder 910, defining the upper limit of the bore of the flange 902 and the lower end of the bore 911 of the upwardly projecting neck portion of the spacer ring next above, so that the annular passage 907 is provided with an upward and inward continuation 912 above the O-ring 913 disposed in the internal annular recess 901 of the upper member. A flow passing spacer ring 915 is disposed in the recess 901 above the O-ring sealing ring 913 and prevents the O-ring from sealing against the upper surface 916 of the recess 901. The spacer ring 915 may be formed in the manner shown in FIGURE 13 from an annular ring of flat material having substantially two helical coils overlying each other as shown in FIGURE 13 and having the opposite ends of the coils terminating short of each other whereby a curved space 933 is formed above and a similar curved space 934 is formed below the intermediate portion 935 of the coil flat material. The space 916 in FIGURE 12 corresponds to the upper space 933 in FIGURE 13, and this space permits fluid to flow inwardly from the recess 901 and prevents the O-ring from sealing against the upper wall surface 916 of the recess 901. If desired, a ring similar to the ring 940 shown in FIGURE 14 may be provided instead of the ring 915. The ring 940 has a plurality of radial slots 941 formed in one surface thereof and these slots provide flow spaces between the ring and the surface 916, while the opposite planar surface or side 942 of the spacer is engaged by the O-ring. The fluid may therefore flow from the recess 901 through the passages 941 to the passage 912 to prevent the O-ring from sealing in an upward direction. The ring 940 will, however, seal against the outer surface of the neck 908 and the lower wall surface 917 of the recess 901 to prevent flow from the bore of the spacer rings past the O-ring and through the passages 907 and 906 to the exterior of the spacer rings.

Figure 12:
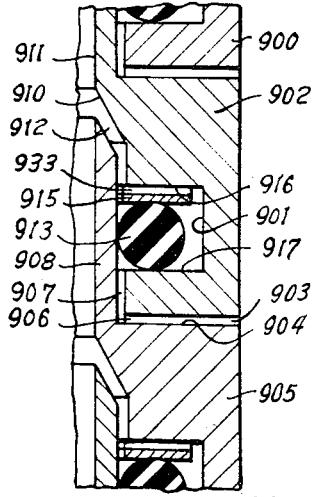
FIGURE 12 is a fragmentary vertical sectional view of a modified form of the device of FIGURE 8.
Figure 15:
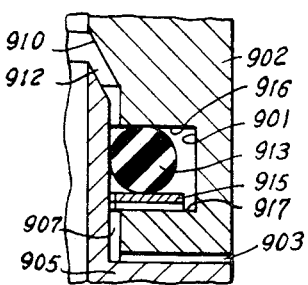
FIGURE 15 is a view similar to FIGURE 12, showing the seal ring assembly arranged to prevent flow in the opposite direction.

FIGURE 15 is identical of FIGURE 12 but shows the flow passing spacer ring disposed below the O-ring sealing ring 913 in such a fashion that the O-ring seals against the exterior of the neck 908 and the upper surface 916 of the recess to prevent inward and upward flow of fluids from the passages 906 and 907 through the passage 912, but permits downward flow through the passage 912 past the O-ring and outwardly through the passage 907 and the passage 906 to the exterior of the spacer rings 900.

It will therefore be seen that a new and improved one way sealing ring structure has been provided for permitting flow of fluids in one direction therepast but preventing flow of fluids in the opposite direction, and that a plurality of such sealing ring structures may be incorporated in a single tool to provide for a substantial volume of flow past the sealing ring structures in one direction but to shut off flow therepast in the opposite direction.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A one-way seal device including: a central member; an annular member surrounding said central member and spaced therefrom to provide a flow passage therebetween; an annular recess means in one of said members opening to said annular flow passage between said members; an O-ring disposed in said recess and engageable with one wall surface of said member having the recess therein adjacent said annular space between the members and engageable with the adjacent surface of the other member to seal therebetween; and a flow passing member disposed in said recess and having planar supporting surface means engageable with said O-ring preventing sealing engagement with said O-ring with the wall surface of said recess opposite said one wall surface and flow passage means thereon in a surface facing opposite and spaced from said supporting surface and the O-ring supported thereby to permit flow of fluids past said O-ring through said annular space between said members, said supporting surface preventing engagement of said O-ring with said flow passage means at any position of said O-ring.

2. A one-way seal device of the character set forth in claim 1, wherein: said flow passing member is in the form of an annular rigid spacer ring disposed in said annular recess and having said supporting surface means formed on one surface thereof and said flow passage means formed in the surface thereof facing opposite said supporting surface and spaced therefrom.

3. A one-way seal device of the character set forth in claim 1, wherein: said flow passing member comprises an annular rigid spacer ring having an annular planar surface at one end thereof providing said supporting surface means and having at least one radially extending flow passage formed in the opposite end surface thereof and spaced from said supporting surface.

4. A one-way seal device including: a first member having an annular sealing surface; a second member adjacent said first member and having an annular surface adjacent and spaced from said annular sealing surface of said first member and provided with an annular recess therein alined with the annular sealing surface of said first member; an O-ring sealing member disposed in said annular recess of said second member and engageable with the sealing surface of said first member and one wall of said recess of said second member for sealing therebetween to prevent flow of fluids through said annular flow passage between said members in one direction; and annular spacer means in said recess and having a rigid cylindrical supporting surface engageable with said O-ring sealing means and an opposite wall of said second member for preventing sealing engagement of said O-ring sealing ring with said opposite wall of said second member, said spacer means having flow passage means formed thereon in a surface facing opposite and spaced from said supporting surface to permit flow of fluids through said flow passage means past said O-ring in the opposite direction to said one direction in said annular space between said members, said supporting surface also preventing sealing engagement of said O-ring with said flow passage means for any position of said sealing means in said recess.

5. A one-way seal member of the character set forth in claim 4, wherein: said annular spacer means comprises an annular rigid cylindrical ring having an annular surface at one side thereof providing said supporting surface and having at least one longitudinally extending flow passage formed in the opposite side surface thereof and spaced from said supporting surface.

References Cited
UNITED STATES PATENTS

| | | | |
|---|---|---|---|
| 2,872,221 | 2/1959 | Burns et al. | 277—177 |
| 2,614,793 | 10/1952 | Storm | 137—525 |

WILLIAM F. O'DEA, *Primary Examiner.*

DAVID J. ZOBKIW, *Assistant Examiner.*